July 10, 1956 F. E. DULMAGE 2,753,595
PLASTICS MIXING AND EXTRUSION MACHINES
Filed July 24, 1953
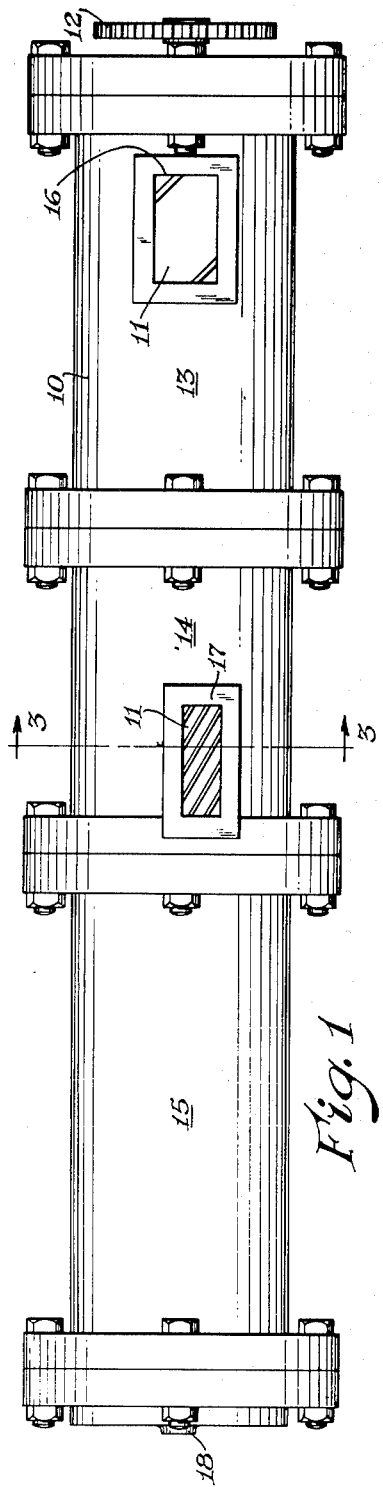
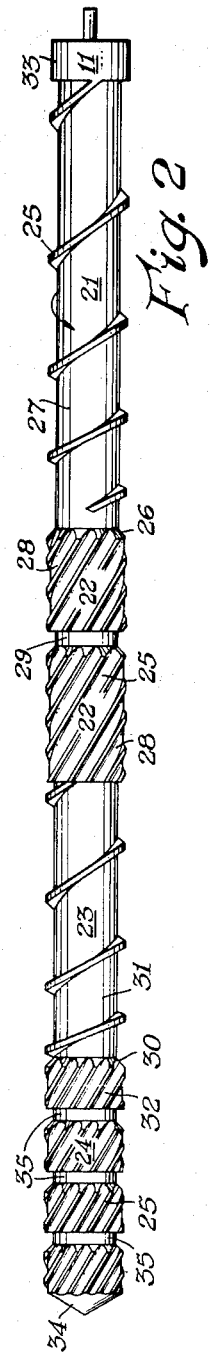
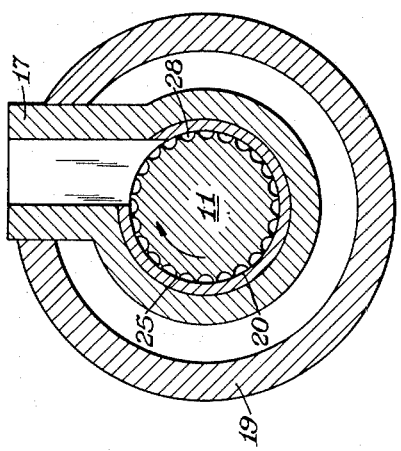
INVENTOR
Frederick E. Dulmage
BY
Griswold & Burdick
ATTORNEYS United States Patent Office 2,753,595
Patented July 10, 1956

2,753,595

PLASTICS MIXING AND EXTRUSION MACHINES

Frederick E. Dulmage, Saginaw, Mich., assignor to The Dow Chemical Company, Midland, Mich., a corporation of Delaware Application July 24, 1953, Serial No. 370,037

3 Claims. (Cl. 18—12)

This invention relates to an improvement in machines for mixing and extruding organic thermoplastics. It relates in particular to a machine capable of mixing, devolatilizing and extruding plastics continuously.

Various means have been used to blend organic thermoplastics with such modifying materials as plasticizers, lubricants, pigments or dyes, and the like. This has often required the use of a plurality of machines such as dry mixers, compounding rolls, various types of kneaders or masticators, and other diverse machines. This is costly, time consuming, and each handling of the material increases the chances of contamination. To overcome this problem, various attempts have been made to effect the mixing and homogenizing in the extrusion device itself. Since most such machines are worm-fed, and since a feed worm is fundamentally inefficient as a mixer, the suggestions have usually involved complex baffling attachments to create turbulence and mixing where none normally occurs. These devices create inordinately large back pressures, and uneconomical amounts of work are required to drive the worm. They do not avoid or overcome the common pulsations of a screw-fed extruder. Further, it has usually been necessary to put the extruded mix through the machine two or three times to effect the desired blending and to realize the uniformity previously obtained with compounding mills, and each pass through the extruder has had to be followed by a cutting, chopping or grinding step to give a suitable granular feed for the next pass. Such multiple-pass treatments may require the plastic, especially if heat-sensitive, to remain heated long enough to induce degradation or oxidative discoloration.

Another problem which has not been solved satisfactorily in the past has arisen due to the presence of volatile materials in the plastic material fed to and emerging from the extruder. The extruded product, containing volatile matter, has had a lower density than is theoretically attainable. This is true, whether or not the plastic has been subjected, during the course of its preparation, to a special devolatilizing treatment under vacuum. Since the plastic feed material will ordinarily have stood for prolonged periods before being used, it will have acquired a moisture content in equilibrium with that of the ambient air. This moisture, together with traces of volatile organic matter, such as unpolymerized monomer or unremoved solvent, and with the air which becomes entrapped in the mass while it is being advanced through an extruder, expands within the plastic at the prevailing high temperature as the pressure on the mass is released at or near the extrusion orifice, and a low density material or one with surface blemishes is obtained.

In my prior U. S. Patents No. 2,453,088 and No. 2,607,077 there have been described two helically fluted mixing torpedos which can be used as extensions of a shortened feed worm in the barrel of a plastics extruder, and which avoid or overcome the usual surges and pulsations in the delivery rate of the machine. Such torpedos are efficient means for milling and blending the plastic to a state of homogeneity never previously attainable in a single pass through an extruder, but their use along does not overcome the problems arising from the present of volatile matter in the plastic. Since, from its nature, this problem can only be solved in the exteruder, various devices have been proposed for removing the volatile matter from points within the extruder barrel.

In one such machine, the compressive action of the screw is lost at a point near the orifice due to an enlargement of the barrel at that end of the machine, and, while some devolatilization is effected by a vacuum applied at that point, this advantage is offset by the inability of the machine as so-modified to assure a steady feed of plastic under constant pressure to the orifice. Another machine operates intermittently, applying vacuum to the material near the center of the screw only while the screw is stationary. This has its obvious disadvantages when maximum output is desired from the machine. One or more extruders are known which forward the fused plastic by means of tandem compressive screw flights past small vacuum ports in the barrel. In the normal linear flow of plastic along such a screw flight, only that part of the plastic can be devolatilized which passes directly across the vacuum port, and this is necessarily only a small percentage of the plastic mass in the machine. Even in those machines which pass the fused plastic in a thin tubular stream from one screw flight to another in tandem with it, a vacuum port, or vent opening, past which the tubular stream must flow, is only effective to devolatilize that small fraction of the mass which moves linearly past the opening. Other known machines, having parallel twin screws, effect devolatilization by generating frictional heat in high pressure or reverse flow stages and using the latent heat to vaporize volatile matter in low pressure stages in which the plastic is not under positive motion imparted by the screws. Since positive throughput in the least possible time is essential with heat sensitive plastics, and since the formation of dense extrusions requires that the discharge end of the machine be constantly full of devolatilized plastic, these machines do not serve the present purpose.

It is accordingly among the objects of the invention to provide a simple modification of a plastics extruder, such that the modified machine effectively frees the plastic from volatile matter without interruption in its output and preferably without necessity for applying a vacuum to the plastic. A related object is to provide such an apparatus wherein a constant supply of plastic, under a constant pressure and having a uniform velocity, is assured at the discharge orifice. A further object is to provide such a machine which will effect thorough mixing of the feed and will discharge a homogeneous product without pulsation. A special object is to provide such an apparatus having a single cylindrical barrel so that it can be made by simple modification of standard extruders. Other and related objects may appear hereinafter.

The extrusion machine of the present invention has a single longitudinal rotor therein, comprising two compressive screw sections connected in tandem in a single cylindrical barrel, with a helically groved milling section interposed between and continuous with the two screw sections, the said barrel having a rectangular, longitudinally disposed opening shorter than, but in the section surrounding the milling portion of the rotor toward the discharge end thereof, the width of said opening spanning about 45 to 70 degrees on the surface of the rotor. The opening is preferably in an upper quadrant of the horizontal barrel on the side of the midline toward which the rotor is adapted to turn. It is preferred also to employ a helically grooved torpedo beyond the second screw flight, as the terminal portion of the rotor. Each section of the rotor, including the tandem compressive screw flights and interposed milling section, has some or all of its lands of a diameter to provide close working clearance in the barrel, said clearance being of the order of 0.005 inch per inch of diameter of the barrel. The helically grooved milling section, as described hereinafter, must be one in which the plastic is divided into a plurality of individually rotating and advancing streams, and the lead length of the several helical grooves must be much greater than that of the screw flights in the adjacent sections. In an adequate milling section, the grooves have a lead of from 0.8 to 1.5 times the length of the milling section. In any case, they must have a lead of from 1.1 to 2.7 times the length of the said opening in the barrel which serves as a devolatilization port. Thus, with the said opening spanning from 45° to 70° on the surface of the rotor, and the maximum possible throughput of viscous plastic, all the plastic rotating in the grooves is brought at least once across the said opening in the barrel during its passage through the milling section. With narrower openings, only part of the plastic is exposed to devolatilization conditions. When the opening spans over 70° on the rotor, the plastic tends to leave the grooves and to leave the extruder through the devolatilization port. With lead lengths of the grooves less than 0.8 times the length of the milling section, or less than 1.1 times the length of the devolatilization port, there is not enough rotation of the plastic in the grooves, and inadequate exposure of the plastic to devolatilization conditions. When the lead length of the grooves is over 1.2 times the length of the milling section, or more than 2.7 times the length of the devolatilization port, the rotating plastic streams advance too rapidly for all of the material in the several grooves to be exposed to the devolatilization conditions, i. e., the plastic in some of the grooves traverses the length of the milling section before those grooves are turned past the face of the opening. The tandem screw flights must each have a compression ratio of at least 1.2-to-1 to assure a continuous and adequate supply of plastic under pressure to the milling section and to the terminal torpedo. Optimum velocity is imparted to the plastic in the milling section when the feed screw has a compression ratio near 2-to-1. Further details will be described hereinafter with reference to the accompanying drawings, wherein Fig. 1 is a plan view of the new extruder;

Fig. 2 is a plan of the rotor member; and,

Fig. 3 is an enlarged cross-section through the extruder, taken along line 3—3 of Fig. 1. In Fig. 1 and 2, the illustrated helical grooves have been enlarged and their number has been reduced, for ease of illustration.

For purposes of the following description, a plastic extruder 10, having a single rotor 11 serving as a forwarding means and driven as though sprocket 12, may be considered as being divided into a feed and melting zone 13, a milling zone 14, and a discharge zone 15. The feed and melting zone 13 has a feed opening or hopper 16 near the drive end of the machine, and the milling zone 14, in the extruder of this invention, has a devolatilization port 17 near the discharge end of that zone. The discharge zone 15 communicates directly with an extrusion orifice 18 or similar outlet for the plastic. Extruder 10 has a steam- or oil-heated jacket 19 (Fig. 3) surrounding its cylindrical barrel 20 in which rotor 11 works.

The rotor 11 of the present invention, one modification of which is illustrated in Fig. 2, has as its essential features a compressive screw flight 21 in the feed section, communicating with a helically grooved or fluted milling section 22 in which the grooves have a lead length of from 0.8 to 1.5 times the length of that section, which, in turn, communicates with a second compressive screw flight 23 in the discharge section. In the illustrated embodiment, the second screw flight 23 feeds a mixing torpedo 24 of the type described in U. S. Patent No. 2,453,088, though this preferred element is optional. The lands 25 of screw 21 and those of screw 23 have the same working clearance within the barrel 20, being of the order of 5 mils per inch of diameter. At least a portion of the lands 25 of the milling section 22 and of grooved torpedo 24, when such a torpedo is used, have the same diameter and working clearance as those of screw flights 21 and 23. The said working clearance is of the order of 0.005 inch for each inch of diameter of the barrel.

At the junction between screw section 21 and milling section 22, there is an outwardly flaring taper 26 from the root 27 of section 21 to the root of the grooves 28 in section 22. Milling section 22 may have circumferentially disposed neck 29, usually on the feed side of the center of such section, of a depth equal to that of grooves 28 at the feed end of the milling section. Neck 29 serves as a supplemental mixing zone, as will be described below. When torpedo 24 is employed, its junction with screw section 23 has an outwardly flaring taper 30 from the root 31 of section 23 to the root of grooves 32 in the torpedo.

A port 17 for deaeration and devolatilization of the plastic is provided through the barrel 20 in the portion thereof surrounding the milling section 22 of rotor 11, near its discharge end. Port 17 is preferably rectangular, of a width to span 45° to 70° on the surface of the rotor, and of a length slightly less than the length of that part of the milling section which lies beyond the circumferential neck 29 in the direction of flow of plastic through the machine. More specifically, the port 17 is from 0.55 to 0.7 times the length of the milling section, and is disposed near the discharge end of that section. It is preferred that the devolatilization port 17 be in the upper part of barrel 20, and that one edge of the port 17 lie on the midline of the extruder while the other side is displaced therefrom in the direction of rotation of the enclosed rotor 11. Thus, the port 17 is preferably wholly within the first quadrant of rotation, counting from the upper midline of the extruder.

The operation of the extruder will be described with reference to a specific embodiment like that shown in the accompanying drawings. The rotor 11 had a length of 7 feet 4 inches from the end of its rear bearing 33 to the tip 34 of torpedo 24, and the land diameter of rotor 11 was 4.491 inches, while the root diameter in screw sections 21 and 23 was 3.250 inches, and that of grooves 28 and 32 was 4.116 inches. The root diameter of circumferential neck 29 in the milling section and of similar necks 35 in the torpedo section was 4.116 inches. The feed screw, which was 23 inches long, had a 2-to-1 compression ratio. Milling section 22 was 17 inches long with neck 29 being 1 inch in length and located 6 inches from the feed end of that section. Screw section 23 was 21 inches long and the screw therein had a compression ratio of 1.2-to-1. The terminal torpedo 24 was 17 inches long and had 5 evenly spaced circumferential necks 35. Both the milling section 22 and the torpedo 24 had 24 smoothly rounded grooves helically disposed thereon, of the same hand as the screw flights, with a lead of about 13.5 inches per turn and an actual length of 19.5 inches per turn. Rotor 11 was housed in a cylindrical barrel 20 having a diameter of 4.514 inches. Barrel 20 was surrounded by an oil-heated jacket 19, which was segmented to permit separate temperature controls opposite the various sections of rotor 11. There was a conventional feed hopper 16 near the drive end of the machine, and a devolatilization port 17 was provided, 2 inches wide and 8 inches long opposite the milling section 22 of rotor 11, just ahead of its junction with screw section 23. The devolatilization port 17 thus spanned about 2.43 inches or 62° on the circumference of the working barrel 20 of the extruder, and was positioned in an upper quadrant of the barrel 20 toward which rotor 11 was adapted to turn, as is illustrated in Fig. 3. Eighteen of the 24 grooves were exposed at one time to the devolatilization port 17, and, before the last of these could move to a position of maximum exposure during rotation of rotor 11, the remaining 6 grooves would become exposed. Hence, substantially all of the plastic passing through the milling section 22 would be subjected to devolatilization.

In operation, hot oil was circulated through jacket 19 around the working barrel 20, at the normal temperature for extrusion of the intended plastic feed. Rotor 11 was put in motion and a dry-mixed feed (not previously fused, extruded and cut into granules) comprising ethyl cellulose, plasticizer and pigment was introduced through feed hopper 16. The feed had the desired average analysis, but was not uniform as to plasticizer or pigment concentrations in the various particles. It was reduced to a plastic dough in the compressive screw section and was forwarded from there over the level approach 26 to the fluted milling section 22. Here the plastic mass was distributed among the several rounded grooves 28 whose smaller free volume resulted in a marked increase in the linear velocity of the plastic. Due to the helical disposition of the grooves 28, and to the close working clearance between their lands 25 and barrel 20, the plastic was in continuous rotation within each groove. As small amounts of the plastic rotating in the grooves were spread on the wall of barrel 11 and were picked up by the lands adjoining other grooves, there was a constant interchange and mixing of materials during their flow toward the circumferential neck 29. Here the plastic tended to collect as a "collar" which was constantly perforated by the rapidly rotating streams of plastic discharged continuously from the several grooves. This same action caused a redistribution of the plastic and forwarded it through the several grooves of the next portion of the milling section 22, where a mixing action similar to that described was continued. The plastic mass was thoroughly softened and was under considerable pressure as it advanced through the grooves 28 of the feed end of milling section 22 and through the collar 29 into the grooves in the second part of the milling section. Then, as each rotating mass of plastic, in its helical groove, advanced past port 17 in barrel 20, there was a sudden release of pressure. Any air which had been entrapped in the mixture during the initial melting and compression in the feed zone was released, and a virtual cloud of vapors (mostly moisture and some plasticizer) emerged through port 17. The escaping gases and vapors produced a popping sound at the moment of their release, audible for some distance from the machine, like that commonly heard when steam escapes from a boiling viscous syrup. The movement of the plastic passing port 17 was observed, and there was no tendency for it to rise out of its grooves or to cease its rotation. Due to its high rate of rotation in the helical grooves, and to the pitch of the grooves and size of the port, substantially all of the plastic was exposed to devolatilizing conditions as it passed ports 17. As the plastic was carried beyond the port 17, it was again confined, under pressure, within barrel 20, and, on emerging from the milling section 22 it was subjected to further compaction in the compressive screw section 23. Thereafter it advanced continuously past the torpedo section 24, where further milling and homogenizing occurred, and the blended and devolatilized product then issued through the extrusion orifice, without pulsation. The extruded product was cut into standard "molding granules," the bulk density of which was found to be considerably higher than that of granules cut to the same size from a strip of the same initial composition which had been extruded from a machine which differed from the present one only by omission of the central milling section and of the deaeration and devolatilization port. To determine whether a similar advantage is obtained when using the present machine on various other dry-mixed plastic compositions, several of them were extruded through the present extruder and the bulk density of the cut granules was compared with that of granules cut in the same way from the product of a standard single rotor extruder.

| Plastic Formulation | Apparent Density of Granules, Pound/Cubic Foot | |
|---|---|---|
| | New Machine | Standard |
| A | 0.65 | 0.53 |
| B | 0.65 | 0.61 |
| C | 0.61 | 0.45 |

The denser granules obtained from the new machine were themselves more easily handled in standard molding and extrusion operations, giving uniform, gel-free products. When used to make extruded sheeting, they gave a smooth product which was free from craters or "fish eyes," while the granules from a standard extruder gave a significantly inferior sheeting with many such blemishes.

While the apparatus of the present invention operates satisfactorily with its devolatilization port open to the surrounding atmosphere, due to the large pressure drop adjacent the exposed plastic, it is to be understood that the said port may be connected, if desired, with a vacuum pump to create up to one additional atmosphere of differential pressure to assist in removal of volatile matter.

This application is a continuation-in-part of my copending application Serial No. 238,623, filed July 26, 1951 (now abandoned).

I claim:

1. An extruder for organic thermoplastics, having: a feed end and a discharge end, a horizontally disposed cylindrical barrel, and a single elongated rotor having only a close working clearance in said barrel throughout its length and adapted to convey plastic from the feed end to the discharge end of the extruder; said rotor comprising two compressive screw sections of at least 1.2-to-1 compression ratio in tandem with a helically grooved milling section, with grooves of the same hand as the screw flights with lands between said grooves, at least some of which have close working clearance within the barrel similar to that in those portions of the barrel around the screw flights, interposed between and continuous with the two screw sections; the said barrel having a devolatilization port in the section surrounding the milling portion of the rotor and positioned near the discharge end of said milling section, the width of said port spanning about 45° to 70° on the surface of the rotor, its length being from 0.55 to 0.7 times the length of the milling section; and the helical grooves in the milling section having a lead length from 1.1 to 2.7 times the length of said port.

2. The apparatus claimed in claim 1, wherein the devolatilization port is rectangular and is longitudinally disposed on the barrel, one longitudinal edge of the devolatilization port lying on the upper midline of the extruder, the other longitudinal edge thereof being displaced therefrom in the direction of rotation of the rotor.

3. The apparatus claimed in claim 1, wherein the feed screw flight has a compression ratio of about 2-to-1, the helical grooves of the milling section have a lead length from 0.8 to 1.5 times the length of that section, and the second screw flight has a compression ratio of about 1.2-to-1.

References Cited in the file of this patent

UNITED STATES PATENTS

| 2,519,014 | Bankey | Aug. 15, 1950 |
| 2,607,077 | Dulmage | Aug. 19, 1952 |
| 2,615,199 | Fuller | Oct. 28, 1952 |